United States Patent Office 3,469,096
Patented Sept. 23, 1969

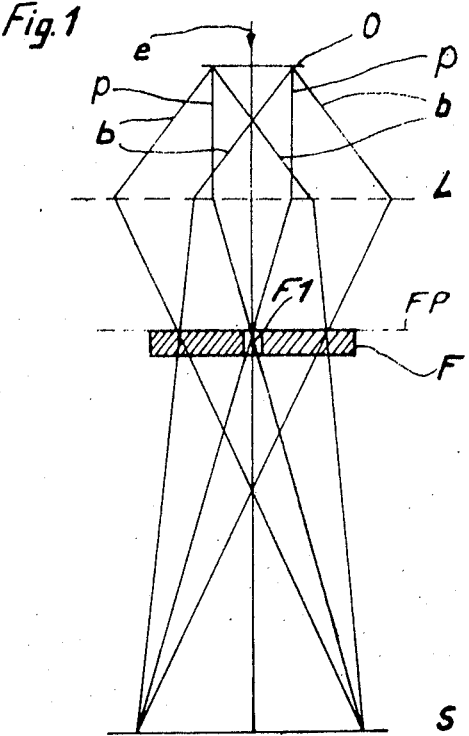
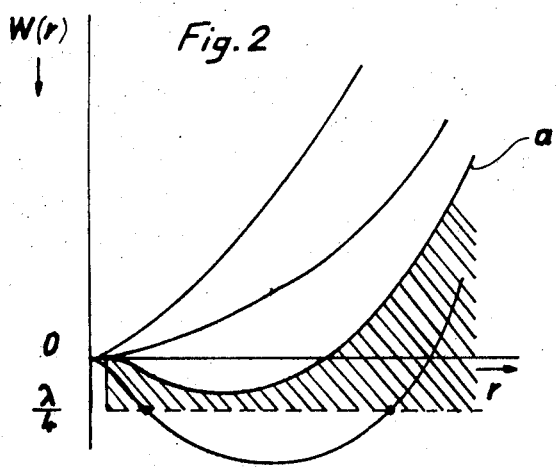

3,469,096
CORPUSCULAR-RAY DEVICE FOR PHASE OR AMPLITUDE SPECIMENS WITH A PHASE-ROTATING FOIL
Karl-Josef Hanssen, Sulzbacherstr. 64, Braunschweig, Germany
Filed Nov. 21, 1966, Ser. No. 595,793
Claims priority, application Germany, Nov. 19, 1965, H 57,729
Int. Cl. H01j *37/26*
U.S. Cl. 250—49.5                                    3 Claims

ABSTRACT OF THE DISCLOSURE

A corpuscular ray device such as an electron microscope having an objective lens producing wave aberration is provided with a phase-rotating foil located preferably in the focal plane of the objective lens on the side thereof opposite the specimen. The foil is constructed so that the phase rotating effect $\Phi = (n+x)\lambda - (-Ar^4 + Br^2)$ where $n$ is a positive or negative whole number, $x$ being ¼ in the case of positive phase contrast, ¾ in the case of negative phase contrast, 0 in the case of amplitude objects with positive contrast and ½ in the case of amplitude objects with negative contrast, $\lambda$ is the wavelength of the corpuscles, $A = C_o/4f^4$, and $B = \Delta F/2f^2$, where $C_o$ is the spherical aberration coefficient, $f$ is the focal distance of the objective lens and $\Delta F$ is the shifting of the focal point in front of the objective lens, and $r$ is the radial spacing from the primary or direct ray. There may also be higher order terms in the foregoing equation for the value of $\Phi$.

My invention relates to corpuscular ray device for phase or amplitude specimens with a phase-rotating foil.

Experiments have been carried out with corpuscular-ray-optical lenses, especially those employed in an electron microscope, on very thin objects or specimens with high resolution for small illumination apertures while using the phase contrast effect. The specimen characteristics determined by the potential distribution in the specimen predominately affect the phase of the incident waves. For the theoretical treatment of the reactions which thereby it is advantageous to consider the specimen, in accordance with Fourier, as being composed of sinusoidal phase gratings of the most varied local frequencies, and to examine the representation respectively of a specific local frequency. A weak cosinusoidal phase grating gives rise to two diffracted rays extending symmetrically to the direction of the incident irradiation, which possess a phase shift of $\lambda/4$ with respect to the primary or direct ray where $\lambda$ = wavelength of the corpuscular ray. For richly contrasting image formation of the local frequency under examination, this phase shift must be made retrogressive by the system forming the image.

As is known in the art, an amplitude object, that is an absorbing object, takes influence on the amplitude of the incident corpuscular wave. Therefore the amplitude in the leaving plane of the objective lens depends on the considered point according to the absorption of the various parts of the object.

A phase object, in contrary, is a non-absorbing object. It influences only the phase of the corpuscle wave and leaves the amplitude unchanged. Thus, in the leaving plane of the objective lens, only the phase depends on the considered point. The phase differences must be transferred to intensity differences in the image plane by additional means in order to get an information concerning the object (phase contrast effect).

It has already become known to place a phase-rotating foil in the focal plane located on the other side of an objective lens from the object specimen so that the primary or direct ray does not experience any phase rotation, whereas the phase-rotating foil imparts a phase-rotation of $\lambda/4$ to all scattered or diffracted rays. However, this known phase-rotating foil does not take account of image defects of the objective lens.

It has already been known to coordinate an objective lens with a diaphragm constructed with alternating succeeding corpuscular ray-permeable and corpuscular ray-impermeable regions, so that it solely permits waves of the same phase to be effective for forming the image. A suppression or fade-out of those rays which do not satisfy the aforedescribed phase condition occurs for the known arrangement, and accordingly a loss of individual local frequency regions must be taken into consideration.

It is accordingly an object of my invention to provide corpuscular-ray device with a phase-rotating foil that does in fact take image defects of the objective lens into consideration and thereby avoids a considerable disadvantage of the known devices of this type. Furthermore, the phase-rotating foil of my invention effects no suppression of the waves that do not fulfill the specific phase condition, but rather apportions these rays through phase-rotation to the phase necessary for producing the image.

With the foregoing and other objects in view, I provide in accordance with my invention, a corpuscular-ray device for phase specimens, especially an electron microscope, comprising an objective lens producing a wave aberration, and a foil advantageously located in the focal plane behind the objective lens and capable of rotating the phase of the corpuscular rays diffracted in the specimen. Further features of this corpuscular ray device in accordance with my invention is that the phase-rotating effect $\Phi$ of the foil with respect to the phase of the primary ray changes with the radial distance $r \neq 0$ from the primary ray taking into account a first constant A proportional to the spherical aberration coefficient of the objective lens, and a second constant B proportional to a defocussing which may be present, at least approximately in accordance with the relationship $$\Phi_+ = (n+\tfrac{1}{4})\lambda - (-Ar^4 + Br^2)$$

for positive phase contrast and $$\Phi_- = (n+\tfrac{3}{4})\lambda - (-Ar^4 + Br^2)$$

for negative phase contrast, wherein $\lambda$ is the wavelength of the corpuscles, $n$ is a positive or negative whole number, $A = C_o/4f^4$ and $B = \Delta F/2f^2$, where $C_o$ is the spherical aberration coefficient of the objective lens, $f$ is the objective focal distance, and $\Delta F$ is the shifting of the focal point in front of the objective lens.

Other features which are considered as characteristic for the invention are set forth in the appended claims.

Although the invention is illustrated and described herein as embodied in corpuscular-ray device for phase or amplitude specimens with a phase-rotating foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which:

FIG. 1 is a schematic view of the ray path of a conventional corpuscular-ray device with a phase-rotating foil;

FIG. 2 is a plot of wave aberration $W(r)$ against radial distance $r$ of the diffracted ray from the direct ray in the focal plane of the objective lens on the side thereof opposite the specimen.

Figure 3:
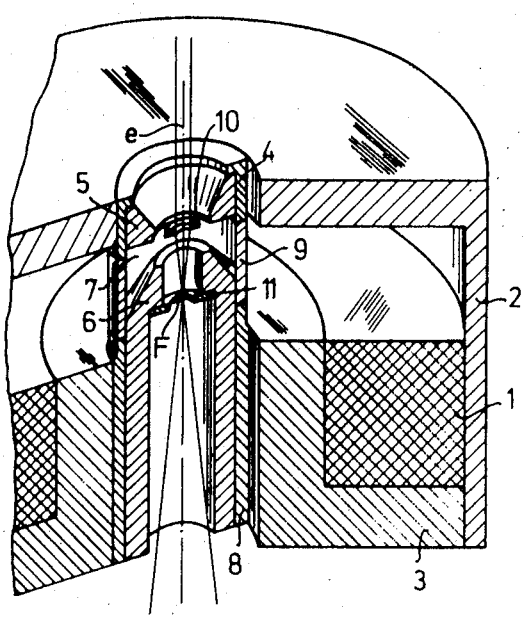
FIG. 3 is a perspective, partly sectional view of the objective lens of an electron microscope having a foil according to my invention.

The ray path, for example of an electron microscope for examining a phase specimen or object when using a conventional phase-rotating foil, is shown schematically in FIG. 1. An electron ray or beam e emitted from a non-illustrated beam-producing system impinges on the specimen or object O where due to diffraction or scattering, a primary or direct beam p and diffracted or bent rays b are produced. The diffracted images are produced by the objective lens L in the focal plane FP located on the side of the objective lens L opposite the specimen. Only the refracting plane of the lens is shown schematically in FIG. 1. The diffracted rays pass through the foil F located at the focal plane FP and undergo a phase shift with respect to the primary rays p which passes through an opening F1 in the foil. For suitable thickness of the foil, the phase shift is equal to $\lambda/4$ so that the aforementioned condition for the richly contrasting image formation of phase structures on a fluorescent screen S of an electron microscope, for example, is met.

As aforementioned, the conventional phase-rotating foil F does not take into consideration the image defects of the objective and is therefore only of limited effectiveness. It has been found namely that the objective lens, for example of an electron microscope moreover exerts an influence on the phase of the diffracted rays. This characteristic is described in terms of the concept of wave aberration. It has been found by experiment that the wave aberration, characterized by the phase rotation which the rays undergo when passing through the objective lens, is not a constant value for the same lens. Quite the contrary, as shown in FIG. 2, which plots the wave aberration $W(r)$, with the excitation of the objective lens as parameter against the radial distance $r$ from the primary ray in the focal plane located behind the lens L, i.e. on the side thereof opposite the specimen, it is apparent that the wave aberration $W(r)$ is a function both of the distance $r$ as well as of the respective objective excitation. The various curves shown in FIG. 2 show the relationship of $W(r)$ and $r$ for different focussing according to the relationship:

$$W(r) = -Ar^4 + Br^2 + \text{higher terms}$$

wherein A is a first constant proportional to the spherical aberration coefficient of the objective lens and B is a second constant proportional to the defocussing.

In contrast to the known phase-rotating foil heretofore described and illustrated in FIG. 1, the phase-rotating effect of the foil according to my invention is accommodated to the development of the wave aberration of the objective lens is shown in FIG. 2, so that with regard to the characteristics of the objective lens, all of the diffracted rays experience the necessary rotation of their phase, whereas the primary ray remains unchanged in phase. Obviously, the relationship shown in FIG. 2 is to be considered as being rotationally symmetrical to the primary or direct ray p.

The production of a phase-rotating foil in accordance with my invention can be effected, for example, by depositing a phase-rotating layer on a thin carrier permeable to corpuscular rays having an opening in the middle thereof.

The effect of the phase-rotating foil provided in accordance with my invention is discernible from the diagram of FIG. 2. Let us assume that the objective lens has a wave aberration $W(r)$ following the characteristic curve $a$, due to suitable excitation. In order to effect the required phase shift of $\lambda/4$ so that consequently all of the waves located on the side of the objective lens opposite the specimen are of the same phase, it is accordingly necessary to dispose the phase-rotating foil so that its phase-rotating effect is given by the indicated region shown with hatching in FIG. 2. In image-forming lens systems which possess additional lenses besides the objective lens, the phase-rotating foil can be coordinated as desired with one or the other of the lenses.

The phase-shifting foil can also be made suitable for the richly contrasting image formation of amplitude objects by employing other dimensioning. The phase-shift thereof then has the following relationships which are analogous to the aforementioned relationships:

$$\Phi_+ = n\lambda - (-Ar^4 + Br^2) + \text{higher terms}$$

for positive contrast, or $$\Phi_- = (n + \tfrac{1}{2})\lambda - (-Ar^4 + Br^2) + \text{higher terms}$$

for negative contrast. An objective lens equipped with such a foil has no spherical aberration, a feature which is basically impossible of attainment for rotationally symmetrical, space-charge-free and time constant lenses proper.

FIG. 3 shows the objective lens of an electron microscope provided with a foil constructed in accordance with my invention which is inserted therein. The objective lens comprises in a conventional manner a coil winding 1 traversible by a current for producing a magnetic flux and an iron yoke or container for conducting the magnetic flux which, in the embodiment shown in FIG. 3, consists of two portions 2 and 3. The magnetic flux completes a circuit through the annular portion 4, both pole shoes 5 and 6 which enclose between them the lens gap 7, and the tubular portion 8. The flux is urged to traverse the lens gap 7 because the member 9 consists of magnetically ineffective or neutral material.

As is shown, the diaphragm 11, with the phase-rotating foil F of my invention, is disposed approximately at the location where the electron ray e is collected or converges through the action of the magnetic lens field in the gap 7 to a point beneath the object carrier diaphragm 10 as viewed in FIG. 3.

For more detailed description of the phenomena described and terminology employed hereinbefore, reference may be had to the book entitled "Transmission Electron Microscopy of Metals" by Gareth Thomas, copyright 1962 by John Wiley & Sons, Inc.

I claim:

1. Corpuscular ray device for phase specimens, especially an electron microscope, comprising an objective lens producing a wave aberration, and a foil advantageously located in the focal plane behind the objective lens and capable of rotating the phase of the corpuscular rays diffracted in the specimen, the phase-rotating effect $\Phi$ of said foil with respect to the phase of the primary ray changes with the radial distance $r \neq 0$ from the primary ray, taking into account a first constant A proportional to the spherical aberration coefficient of the objective lens, and a second constant B proportional to a defocussing which may be present, at least approximately in accordance with the relationship $$\Phi_+ = (n + \tfrac{1}{4})\lambda - (-Ar^4 + Br^2)$$

for positive phase contrast and $$\Phi_- = (n + \tfrac{3}{4})\lambda - (-Ar^4 + Br^2)$$

for negative phase contrast, wherein $\lambda$ is the wavelength of the corpuscles, $n$ is a positive or negative whole number, $A = C_0/4f^4$ and $B = \Delta F/2f^2$, where $C_0$ is the spherical aberration coefficient of the objective lens, $f$ is the objective focal distance, and $\Delta F$ is the shifting of the focal point in front of the objective lens.

2. Corpuscular ray device for amplitude specimens, especially an electron microscope, comprising an objective lens producing a wave aberration, and a foil advantageously located in the focal plane behind the objective lens and capable of rotating the phase of the corpuscular rays diffracted in the specimen, the phase-rotating effect Φ of said foil with respect to the phase of the primary ray changes with the radial distance $r \neq 0$ from the primary ray, taking into account a first constant A proportional to the spherical aberration coefficient of the objective lens, and a second constant B proportional to a defocussing which may be present, at least approximately in accordance with the relationship $$\Phi_+ = n\lambda - (-Ar^4 + Br^2)$$

for positive amplitude contrast and $$\Phi_- = (n + \tfrac{1}{2})\lambda - (-Ar^4 + Br^2)$$

for negative amplitude contrast, wherein $\lambda$ is the wavelength of the corpuscles, $n$ is a positive or negative whole number, $A = C_0/4f^4$ and $B = \Delta F/2f^2$, where $C_0$ is the spherical aberration coefficient of the objective lens, $f$ is the objective focal distance, and $\Delta F$ is the shifting of the focal point in front of the objective lens.

3. In a corpuscular ray device such as an electron microscope, the combination comprising an objective lens producing wave aberration of corpuscular rays passing therethrough from a specimen optically aligned therewith and a foil for rotating the phase of corpuscular rays diffracted in the specimen, said foil being disposed in the focal plane of the lens located on the side of said lens opposite from the object and having dimensions for producing a phase-rotating effect Φ on the diffracted rays relative to the phase of the respective primary rays passing through the specimen, said phase rotation varying with the radial spacing $r \neq 0$ from the respective primary ray modified by a first constant A proportional to the aperture defect constant of said objective lens and a second constant B proportional to any existing defocussing, in accordance with the equation:

$$\Phi = (n+x)\lambda - (-Ar^4 + Br^2) + y$$

where $n$ is a whole number, $x$ is a constant selected from the values 0, ¼, ½ and ¾, $\lambda$ is the wavelength of the corpuscles, $A = C_0/4f^4$ and $B = \Delta F/2f^2$ where $C_0$ is the aperture defect constant of the objective lens, $f$ is the focal length and $\Delta F$ is the displacement of the focal point of the objective lens on the same side thereof on which the specimen is located, and $y$ is at most substantially equal to zero.

References Cited

UNITED STATES PATENTS 3,213,277  10/1965  Hoppe.

RALPH G. NILSON, Primary Examiner

A. L. BIRCH, Assistant Examiner

U.S. Cl. X.R.

335—210